United States Patent [19]
Nakatani et al.

[11] Patent Number: 5,065,803
[45] Date of Patent: Nov. 19, 1991

[54] TIRE AND WHEEL RIM ASSEMBLY

[75] Inventors: Akihiro Nakatani, Kakogawa; Hideaki Nagayasu, Toyota, both of Japan

[73] Assignee: Sumitomo Rubber Industries, Ltd., Hyogo, Japan

[21] Appl. No.: 610,144

[22] Filed: Nov. 6, 1990

[30] Foreign Application Priority Data

Nov. 17, 1989 [JP] Japan ................................. 1-300637

[51] Int. Cl.$^5$ ............................................. B60C 15/06
[52] U.S. Cl. ..................... 152/543; 152/544; 152/547
[58] Field of Search ............... 152/516, 517, 539, 543, 152/544, 549, 555, 379.3, 379.5

[56] References Cited

U.S. PATENT DOCUMENTS 4,508,153  4/1985  Tanaka et al. ...................... 152/543

FOREIGN PATENT DOCUMENTS

| 0167273 | 1/1986 | European Pat. Off. | ............ 152/544 |
| 0167283 | 1/1986 | European Pat. Off. | ............ 152/539 |
| 49-13802 | 2/1974 | Japan . | |
| WO8706889 | 11/1987 | Japan . | |
| 0237205 | 9/1989 | Japan | ................. 152/539 |
| 2179515 | 7/1990 | Japan | ................. 152/539 |

*Primary Examiner*—Michael W. Ball
*Assistant Examiner*—Nancy T. Krawczyk
*Attorney, Agent, or Firm*—Birch, Stewart, Kolasch & Birch

[57] ABSTRACT

A tire and wheel rim assembly in which the tire has a pair of axially spaced bead portions, and the wheel rim has a pair of axially spaced bead seats upon which the bead portions of the tire are seated, at least one of the bead seats is provided at the axially inner edge thereof with a circumferential groove, at least one of the bead portions is provided with a toe extending radially inwardly into the circumferential groove, wherein the toed bead portion comprises a soft rubber layer disposed along the bottom face of the bead portion to form said bead toe and a hard rubber layer disposed radially outside the soft rubber layer, the soft rubber layer is covered by a fabric chafer disposed along the contour of the bead portion, the hard rubber layer is made of relatively hard rubber having a JIS A hardness HS1 of not less than 60 and not more than 95, the soft rubber layer is made of soft rubber having a JIS A hardness HS2 of not less than 48 and not more than 90, and the ratio HS2/HS1 of the hardness HS2 of the soft rubber to the hardness HS1 of the hard rubber layer is not less than 0.7 and not more than 0.95.

1 Claim, 3 Drawing Sheets

TIRE AND WHEEL RIM ASSEMBLY

BACKGROUND OF THE INVENTION

The present invention relates to an assembly of a tubeless tire for heavy duty use and a wheel rim.

In conventional assemblies of a tire and a wheel rim, the bead portions of the tire are held upon the bead seats of the rim by means of air pressure in the tire and friction between the bead seats and the bead bottom faces. Accordingly, the bead portion is apt to move in the tire axial direction, if a lateral force acts on the tire when running deflated. If the bead portion is moved axially inwardly, the bead portion falls into a tire mounting well of the rim, and finally the tire is displaced from the rim.

As countermeasures to prevent tire displacement, there have been proposed:

a wheel rim provided with a protrusion located axially inside the bead seat to prevent axially inward movement of the bead portion;

a tire and wheel rim assembly in which the wheel rim is provided with a protrusion in the middle of the bead seat, the protrusion extending into a circumferential groove formed in the bead bottom of the tire (Japanese Patent Publication JP-A-49/13802); and a tire and wheel rim assembly in which the tire is provided with a toe protruding radially inwardly into a circumferential groove formed axially inside the bead seat of the rim (PCT International Publication WO87/06889).

The assembly disclosed in PCT International Publication WO87/06889 is most effective in the prevention of tire displacement, but inferior in tire mounting and dismounting activities.

If the amount of protrusion of the toe and the groove depth are decreased, the mounting and dismounting becomes easy, but the engagement therebetween is also reduced, which results in easy displacement of the tire from the wheel rim.

SUMMARY OF THE INVENTION

It is, therefore, an object of the present invention to provide a tire and wheel rim assembly in which the work of mounting the tire on the rim becomes easy while maintaining superior resistance to displacement.

According to one aspect of the present invention, the tire and wheel rim assembly comprises a wheel rim and a tire mounted thereon, the tire having a pair of axially spaced bead portions, the wheel rim having a pair of axially spaced bead seats upon which the bead portions of the tire are seated, at least one of the bead seats provided at the axially inner edge thereof with a circumferential groove.

at least one of the bead portions provided with a toe extending radially inwardly into said circumferential groove, wherein each toed bead portion comprises a soft rubber layer disposed along the bottom face of the bead portion to form said bead toe, and a hard rubber layer disposed radially outside the soft rubber layer, said soft rubber layer is covered by a fabric chafer disposed along the contour of the bead portion, said hard rubber layer is made of relatively hard rubber having a JIS A hardness HS1 of not less than 60 and not more than 95, said soft rubber layer is made of soft rubber having a JIS A hardness HS2 of not less than 48 and not more than 90, and the ratio HS2/HS1 of the hardness HS2 of the soft rubber layer to the hardness HS1 of the hard rubber layer is not less than 0.7 and not more than 0.95.

BRIEF DESCRIPTION OF THE DRAWINGS

An embodiment of the present invention will now be described in detail in conjunction with the drawings, in which.

DETAILED DESCRIPTION OF THE INVENTION

Figure 1:
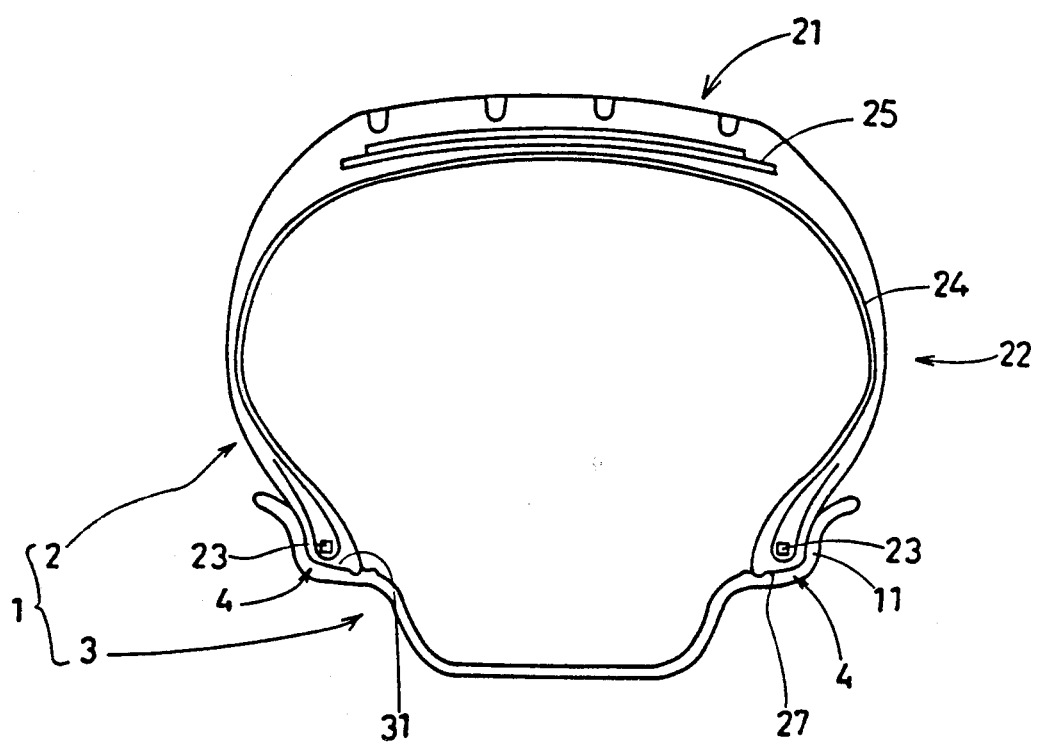
FIG. 1 is a schematic sectional view showing an embodiment of the present invention.
Figure 2:
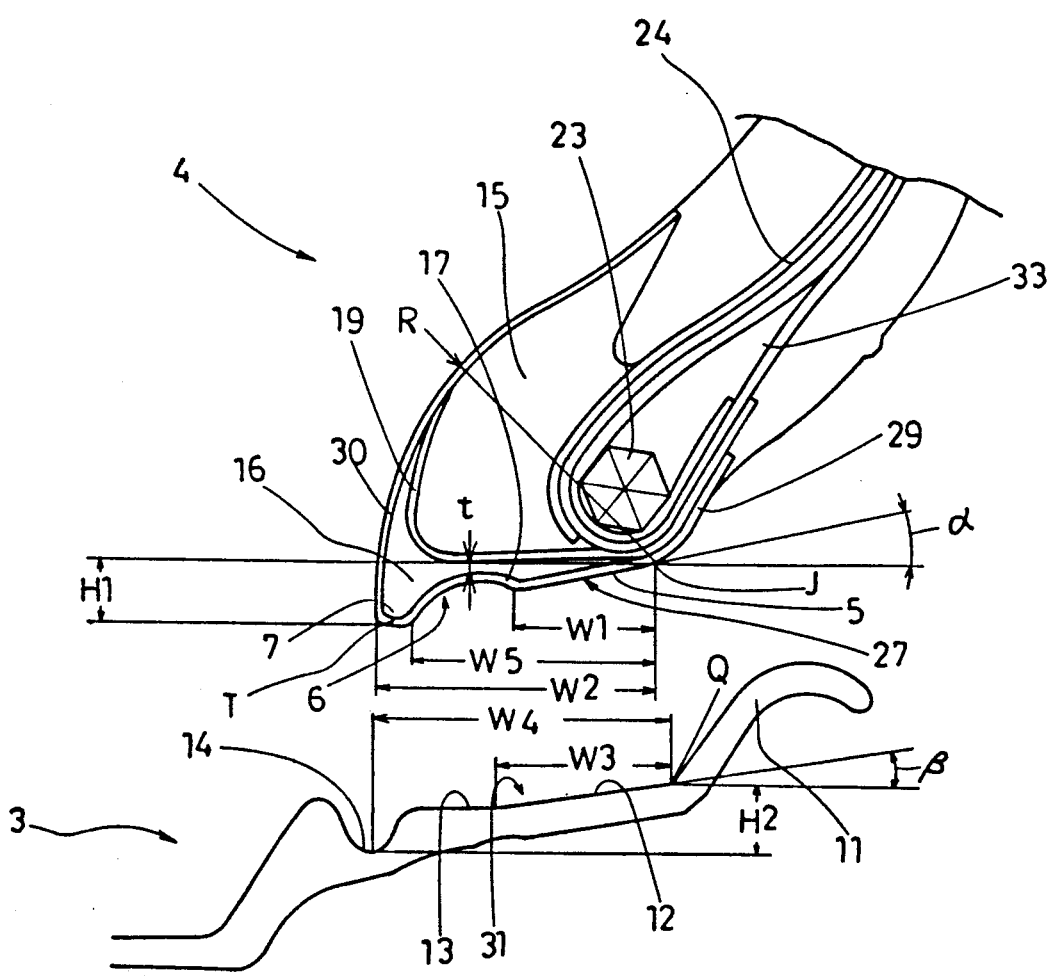
FIG. 2 is a sectional view showing a tire bead portion and a wheel rim bead seat.

In FIGS. 1 and 2, a tire and wheel rim assembly 1 comprises a wheel rim 3 and a tire 2.

The wheel rim 3 has a pair of axially spaced bead seats 31, a tire mounting well located between the bead seats, and a pair of flanges 11.

The tire 2 has a pair of bead portions 4, a tread portion 21 and a pair of sidewall portions 22 extending between the tread edges and the bead portions.

The tire is mounted on the wheel rim by seating the tire bead portions upon the rim bead seats.

The tire 2 comprises a pair of bead cores 23 disposed one in each bead portion, a carcass 24 having at least one ply of radially arranged cords extending between the bead portions 4 and turned up around the bead cores 23 from axially inside to the outside thereof to form turned up portions, and a belt 25 disposed radially outside the carcass 24 in the tread portion.

For the carcass cords, organic fiber cord such as aliphatic polyamides, rayon, polyesters, aromatic polyamides, and the like, carbon fiber cords, glass fiber cords, metal fiber cords, and the like can be used.

The belt 25 is composed of plural plies of high elastic modulus cords such as aromatic polyamide fiber cords, carbon fiber cords, grass fiber cords, metal fiber cords and the like.

The belt cords are laid at relatively small angles with respect to the tire circumferential direction, for example 10 to 30 degrees.

As shown in FIG. 2, each bead portion 4 is provided with a toe 7.

Here, the surface of the bead portion is defined as follows:

a bottom face 27 extending between its axially outermost heel end J and innermost toe tip T;

an outside face 29 extending radially outwardly and axially outwardly from the heel end J; and an inside face 30 extending radially outwardly from the toe tip T.

The bead portion is further provided with a circumferential groove 6 immediately axially outside the toe 7, whereby the bottom face 27 is composed of the grooved part 6, a main bead base part 5 extending between the axially outer edge of the grooved part and the heel end, and a projecting toe part 7 extending between the axially inner edge of the grooved part and the toe tip T.

The bead base part 5 is tapered axially inwardly from the axially outermost heel end J to its innermost edge so that the diameter of this part decreases from the axially outside to the inside. The inclination angle (alpha) thereof is in the range of 10 to 25 degrees with respect to the axial direction of the tire. In this embodiment, therefore, the above-mentioned grooved part 6 is defined as a part located radially outside an imaginary line extended from the bead base part at the same inclination. Also, the toe part 7 is defined as a part located radially inside the above-mentioned imaginary line.

The wheel rim 3 has a pair of flanges 11 as mentioned above.

Each flange 11 extends radially outwardly and axially outwardly from the axially outer edge Q of each bead seat 31.

The bead seat 31 comprises a main bead seat part 12 tapered axially inwardly at an inclination angle (beta) of 10 to 20 degrees with respect to the tire axial direction, and a parallel part 13 extending axially inwardly from the axially inner edge of the bead seat part 12 in substantially parallel relationship with the tire axial direction.

Further, at the axially inner edge of this parallel part 13, a circumferential groove 14 extending circumferentially around the wheel rim is formed.

As a result, a circumferentially extending hump is formed immediately axially inside the groove 14. In this embodiment, the diameter of the hump measured at the top is set larger than that of the parallel part 13 and smaller than the rim diameter at the edge Q.

The size of the rim bead seat 31 and the size of the tire bead bottom face 27 when the tire is not mounted are set as follows.

The ratio W2/W4 of the axial width W2 of the bead bottom face 27 measured from the heel end J to the toe tip T to the axial width W4 of the bead seat 31 measured from the axially outer edge Q to the center of the bottom of the circumferential groove 14 is not more than 1.0 and not less than 0.7.

Further, the ratio W1/W3 of the axial width W1 of the main bead base part 5 to the axial width W3 of the main bead seat part 12 is not more than 1.0 and not less than 0.5.

Furthermore, the ratio H1/H2 of the radial distance H1 between the heel end J and the radially innermost end of the bead toe 7 to the radial distance H2 between the outer edge Q and the bottom of the circumferential groove 14 is not less than 0.7 and not more than 1.2.

By setting the ratios in this way, the bead base part 5, the grooved part 6 and the toe part 7 can fit on the bead seat part 12, the parallel part 13 and the groove 14, respectively.

Further, the axial width W2 of the bead bottom face 27 is 0.94 to 0.95 times distance L measured between the heel end J and the toe tip T, and the axial distance W5 measured from the heel end J to the axially inner edge of the groove 6 is 0.85 to 0.65 times the distance L.

In the bead portion 4 of the tire, as shown in FIG. 2, a bead apex 33 made of hard rubber extending tapering radially outwardly from the radially outside of the bead core 23 is disposed between the carcass main portion and the carcass turned up portion, and a soft rubber layer 16 is disposed along the above-mentioned bead bottom face 27 and the inside face 30 to form the bead toe 7, and further a hard rubber layer 15 is disposed radially outside the soft rubber layer 16.

Further, in the bead portion, a chafer 17 made of an organic fabric is disposed along the contour of the bead portion, and a reinforcing layer 19 made of an organic fabric is disposed between the soft rubber layer 16 and the hard rubber layer 15.

The chafer 17 extends from the outside face 29 to the inside face 30 through the bottom face 27, that is the above-mentioned bead base part 5, the grooved part 6 and the toe part 7, whereby the soft rubber layer 16 is completely covered by the chafer.

The reinforcing layer 19 extends completely from the outside to the inside of the bead portion to avoid direct contact between the soft rubber layer and the hard rubber layer, which improves the adhesion between the soft and hard rubber layers, and also facilitates tire making work.

The reinforcing layer 19 is formed in a U-shaped sectional shape having an axially directed main portion and two radially outwardly directed axially inner and outer edge portions, wherein:

the main portion extends substantially parallel or at a less inclination angle than the angle (alpha) with respect to the tire axial direction from the axially outside of the bead portion to a position above the axially inner edge of the grooved part 6;

the outer edge portion is extended along the outside of the carcass turned up portion and laid between the carcass turned up portion and the chafer; and the inner edge portion is extended radially outwardly from the above-mentioned position above the grooved part 6 and terminated at a position where this portion contacts with the axially inner portion of the chafer. However, this axially inner portion of the chafer is further extended so as to cover about a half of the axially inner face of the hard rubber layer 15.

On the other hand, the above-mentioned bead core 23 is located near the bead heel J, and there are the chafer 17, the reinforcing layer 19 and the carcass plies between the axially outside and radially inside of the bead core and the rim flange 11 and bead seat 12, but the rubber layers 15 and 16 do not exist therebetween.

In other words, an axially outer portion of the reinforcing layer 19 contacts directly with the carcass, and also an axially outer portion of the chafer 17 contacts directly with the reinforcing layer.

As a result, the soft rubber layer 16 and the major part of the hard rubber layer 15 are located axially inside the bead core. Aside from the grooved part 6, the thickness in the tire radial direction of the soft rubber layer 16 is gradually increased from the axially outside to the inside, and the minimum thickness (t) in the grooved part 6 is set in the range of 2 to 5 mm.

The hard rubber layer 15 has a thickness such that the distance R, which is measured in a direction at a angel of 45 degrees to the tire axial direction from the heel end J to the axially inside face of the hard rubber layer, is in the range of 1.07 to 0.70 times the above-mentioned distance L between the heel end J and the toe tip T.

The radially outwardly located hard rubber layer 15 is made of relatively hard rubber having a JIS A hardness HS1 of not less than 60 and not more than 95, more preferably not less than 70 and not more than 90.

On the other hand, the radially inwardly located soft rubber layer 15 is made of soft rubber having a JIS A hardness HS2 of not less than 48 and not more than 90, more preferaby not less than 48 and not more than 85, whereby easy tire mounting becomes possible, and at the same time the bead portion 4 is able to withstand tensile stress which is caused in the axially inside part of the bead portion when the tire is deformed.

Further, the ratio HS2/HS1 of the hardness HS2 of the soft rubber layer 16 to the hardness HS1 of the hard rubber layer 15 is set in the range of not less than 0.7 and not more than 0.95.

When the ratio HS2/HS1 is less than 0.7, the hardness of the radially inner soft rubber layer is very low in comparison with that of the radially outer hard rubber layer, so the radially inner rubber layer is easily deformed and tire displacement from the rim is apt to be caused.

On the other hand, when the ratio is more than 0.95, tire mounting work becomes hard.

The above-mentioned chafer 17 is composed of one ply of rubberized woven fabric made of organic fibers such as nylon, aromatic polyamide, polyester and the like. Preferably, a 840d or 1260d nylon canvas, which is coated with topping rubber so that the thickness of the chafer inclusive of the topping rubber is about 1 to 2 mm, is used. However, a substantially non woven fabric made of parallel cords, and a fabric made of metal or grass fibers or cords may be used. As the soft rubber layer 16 is wrapped in the chafer, axial deformation of the bead portion 4 can be reduced.

For the reinforcing layer 19, the same fabric as the chafer 17 is used, but a different fabric can be used.

Test tires of size 215/50R4.5LT were prepared and tested for resistance to displacement or tire retaining force and facility in tire mounting.

The test tires has an indentical structure shown in FIGS. 1 and 2, but the hardness ratios HS2/HS1 were varied as shown in Table 1. The test results are also shown in Table 1.

Figure 3:
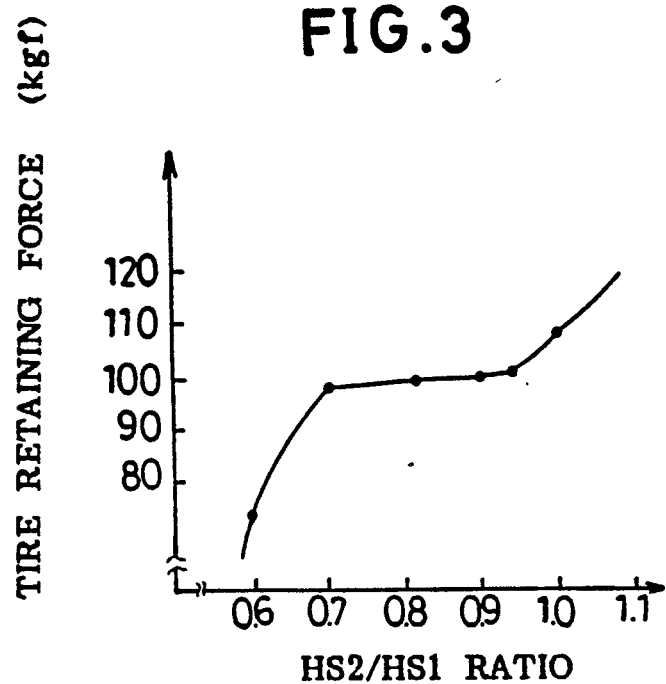
FIG. 3 is a graph showing a relationship between hardness ratio HS2/HS and tire retaining force.

To show the relationship between the tire retaining force (index) and the hardness ratio HS2/HS1, they are plotted on a graph as shown in FIG. 3, wherein the larger the index, the larger the tire retaining force, and the standard index is 100.

Figure 4:
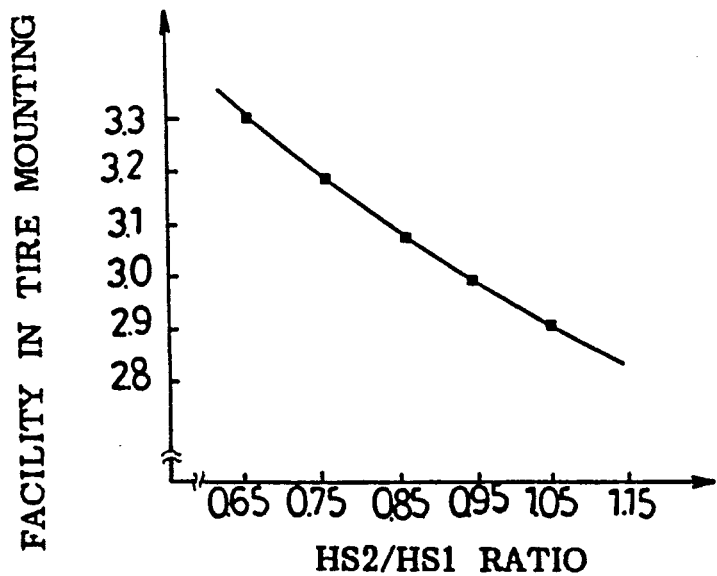
FIG. 4 is a graph showing a relationship between hardness ratio HS2/HS1 and facility in mounting the tire on the rim.

Also, FIG. 4 shows the relationship between the facility in tire mounting and the hardness ratio HS2/HS1. The facility of each tire in mounting work is evaluated into five ranks, wherein the passing point is 3.0 or more.

The test results show that both of the facility in tire mounting work and the resistance to displacement can be achieved by setting the hardness ratio within the above-mentioned specific range.

As explained above, according to the present invention, tire mounting works becomes easier than the prior art assembly, and the working efficiency can be improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1

|  | Ex. 1 | Ex. 2 | Ex. 3 | Ex. 4 | Ex. 5 | Ref. 1 | Ref. 2 | Ref. 3 | Ref. 4 | Ref. 5 | Ref. 6 | Ref. 7 |
| --- | --- | --- | --- | --- | --- | --- | --- | --- | --- | --- | --- | --- |
| Hardness HS1 of hard rubber layer | 85 | 85 | 60 | 95 | 95 | 95 | 85 | 60 | 95 | 97 | 85 | 65 |
| Hardness HS2 of soft rubber layer | 68 | 80 | 48 | 85 | 67 | 57 | 51 | 45 | 91 | 88 | 94 | 45 |
| Hardness ratio HS2/HS1 | 0.8 | 0.95 | 0.8 | 0.9 | 0.7 | 0.6 | 0.6 | 0.75 | 0.96 | 0.7 | 1.1 | 0.7 |
| Tire retaining force |  |  |  |  |  |  |  |  |  |  |  |  |
| (kgf) | 700 | 697 | 620 | 700 | 690 | 500 | 524 | 450 | 710 | 700 | 730 | 450 |
| (Index) | 100 | 100 | 100 | 100 | 100 | 75 | 75 | 70 | 105 | 100 | 104 | 70 |
| Facility in Tire mounting work | 3.5 | 3.3 | 3.5 | 3.0 | 3.5 | 3.5 | 3.3 | 3.5 | 2.8 | 2.8 | 2.5 | 3.3 |

We claim:

1. A tire and wheel rim assembly comprising a wheel rim and a tire mounted thereon,
   the tire having a pair of axially spaced bead portions,
   the wheel rim having a pair of axially spaced bead seats upon which the bead portions of the tire are seated,
   at least one of the bead seats are provided at the axially inner edge thereof with a circumferential groove,
   at least one of the bead portions provided with a toe extending radially inwardly into said circumferential groove, wherein
   each bead portion comprises a soft rubber layer disposed along the bottom face of the bead portion to form said bead toe, an adjacent hard rubber layer disposed radially outside the soft rubber layer, and a fabric reinforcing layer disposed between said soft rubber layer and said adjacent hard rubber layer such that there is no contact between said soft rubber layer and adjacent hard rubber layer,
   said soft rubber layer is covered by a fabric chafer disposed along the contour of the bead portion,
   said hard rubber layer is made of relatively hard rubber having a JIS A hardness (HS1) of not less than 60 and not more than 95,
   said soft rubber layer is made of soft rubber having a JIS A hardness (HS2) of not less than 48 and not more than 90, and
   the ratio HS2/HS1 of the hardness (HS2) of the soft rubber layer to the hardness (HS1) of the hard rubber layer is not less than 0.7 and not more than 0.95.

* * * * *